No. 803,931. PATENTED NOV. 7, 1905.
W. SIEBER.
TRUCK FOR MOLDING MACHINES.
APPLICATION FILED JULY 13, 1905.
3 SHEETS—SHEET 1.
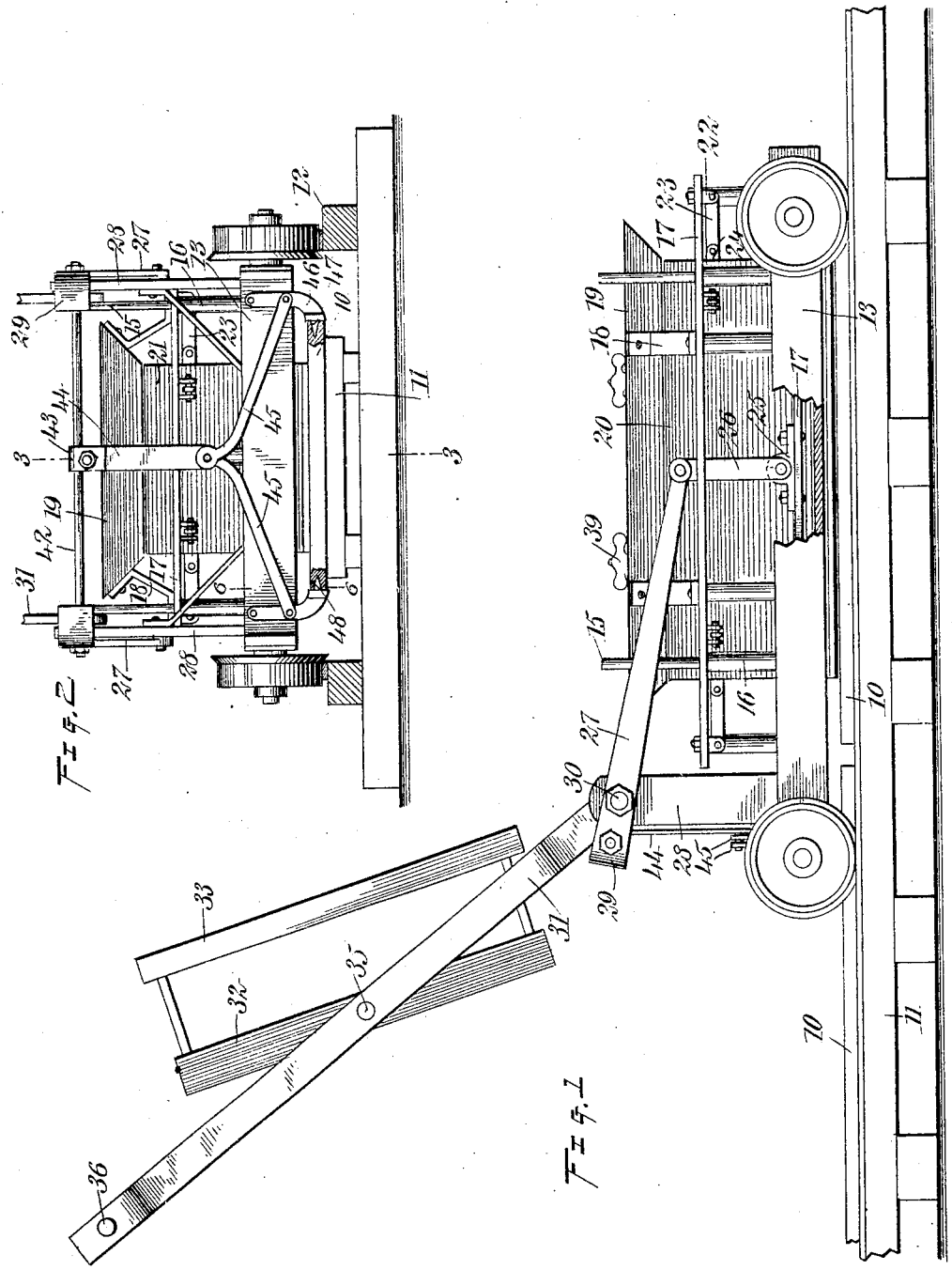
WITNESSES:
INVENTOR
William Sieber
BY
ATTORNEYS

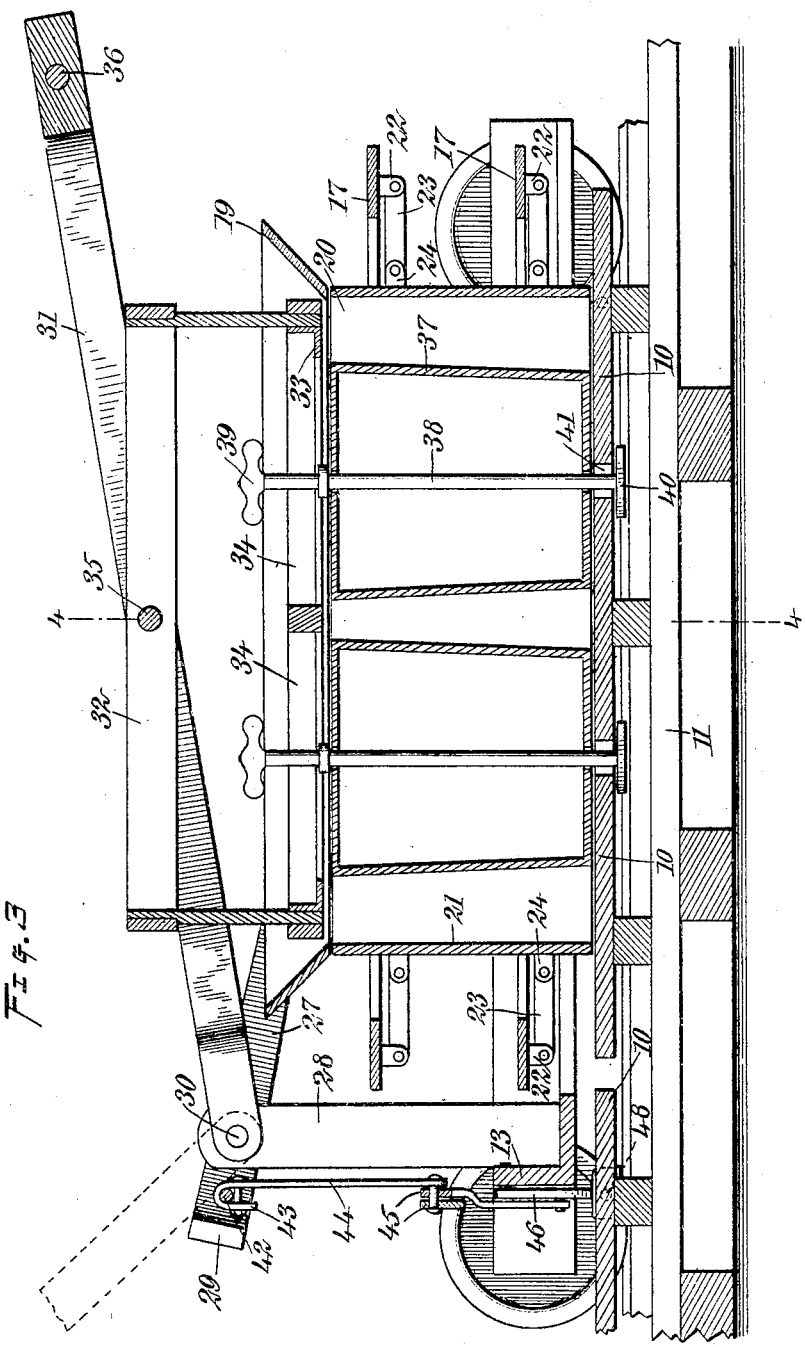

No. 803,931. PATENTED NOV. 7, 1905.
W. SIEBER.
TRUCK FOR MOLDING MACHINES.
APPLICATION FILED JULY 13, 1905.
3 SHEETS—SHEET 3.
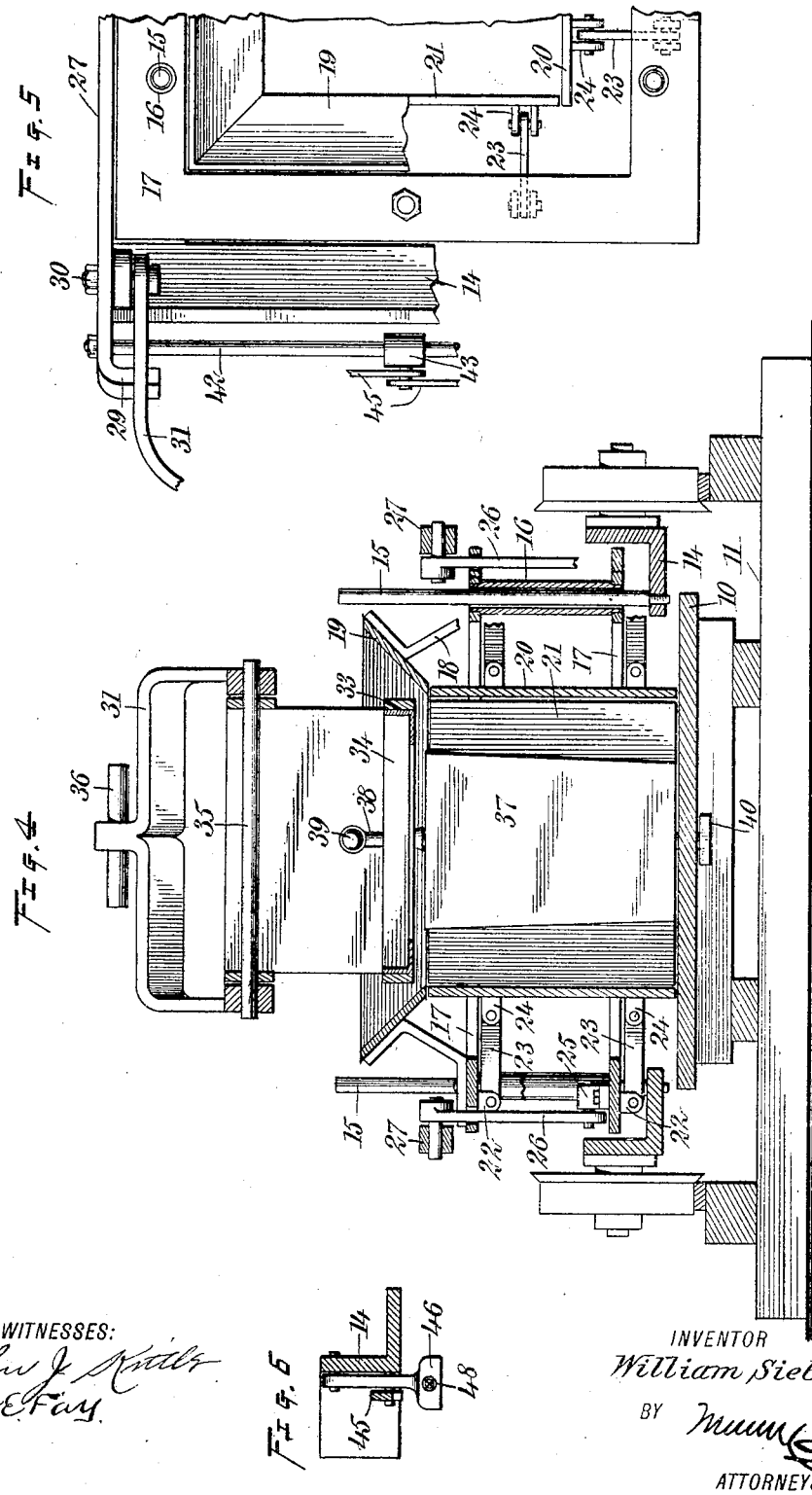
WITNESSES:
INVENTOR
William Sieber
BY
ATTORNEYS

UNITED STATES PATENT OFFICE.

WILLIAM SIEBER, OF HENDERSON, KENTUCKY.

TRUCK FOR MOLDING-MACHINES.

No. 803,931.        Specification of Letters Patent.        Patented Nov. 7, 1905.

Application filed July 13, 1905. Serial No. 269,501.

*To all whom it may concern:*

Be it known that I, WILLIAM SIEBER, a citizen of the United States, and a resident of Henderson, in the county of Henderson and State of Kentucky, have invented a new and Improved Truck for Molding-Machines, of which the following is a full, clear, and exact description.

My invention relates to improvements in that system of molding concrete blocks and other articles which has for its basis the use of a series of pallets located along the floor of the plant and the transfer of a mold from one to another and leaving the molded articles upon the pallets after the mold is removed.

The invention relates especially to a new and improved means for supporting and moving the mold from one pallet to another along the tracks, said means being provided with a tamping device and a mold-removing device and also with means for centering the mold with respect to the various pallets.

In using this system the expense of pallets is greatly reduced over that in which they are employed over and over again in the mold and in which they are moved from the mold to support the block or other article to be molded. It also provides for a decrease in the expense due to the waste of blocks injured in moving them, which is an incident to other systems of molding, and it has various other advantages in use which will appear from the description below.

Reference is to be had to the accompanying drawings, forming a part of this specification, in which similar characters of reference indicate corresponding parts in all the views.

Figure 1 is a side elevation of a portion of a plant, showing a mold supported on a truck constructed in accordance with the principle of my invention, parts being broken away to show the construction. Fig. 2 is an end elevation of the same, partly in section. Fig. 3 is a longitudinal sectional view on the line 3 3 of Fig. 2. Fig. 4 is a transverse sectional view on the line 4 4 of Fig. 3. Fig. 5 is a fragmentary plan view, and Fig. 6 is a sectional view on the line 6 6 of Fig. 2.

The system to which my machine is especially adapted involves the use of a plurality of pallets 10, preferably mounted on slightly-elevated supports 11. These pallets are arranged in lines, so that the mold can be moved readily from one to the other and removed from them, so as to leave the block in a stationary position upon the pallets when the molding operation is completed. These pallets are generally arranged between tracks 12, and on these tracks runs a truck 13. This truck is provided with a depressed body 14, having upright guides 15 for the reception of guide-sleeves 16, which are mounted on frames 17, that support brackets 18, which carry a hopper 19 and also the mold itself. This mold is without a top and bottom and comprises side walls 20 and end walls 21.

Supported from the frames 17 are brackets 22, to which are pivotally connected links 23, that are in turn pivotally connected with lugs 24 upon the sides and ends, respectively, of the mold. It will be seen that when the frames 17 are lifted by any desired means the four mold-walls will not be carried with them at first, but will be caused to move outwardly before they are elevated, so that if the inner sides of these walls are provided with projections or indentations for the purpose of providing any desired configuration upon the molded article they will be drawn outwardly from the latter and will not injure the soft plastic material of which it is composed. The guide-sleeves 16 rigidly secure the two frames 17 together, so that their motion is always simultaneous.

Upon one of the frames 17 is located a bracket 25, which is pivotally connected with a link 26, that in turn pivotally depends from a lever 27. This lever is pivotally mounted upon a standard 28 upon the truck. This forms the only positive connection between the truck and mold. The lever extends beyond the rear of the standard 28 and is provided with an arm 29 for a purpose to be described.

Pivotally mounted on the standard 28 upon a stud 30, which also supports the lever 27, is a second lever 31. This lever is provided with a frame 32, which is preferably hollow and which supports a tamping-head 33, provided with perforations 34, if desired. This tapping-head is preferably pivotally mounted upon the lever 31 by means of a shaft 35, or it may be fixed to it at the desired angle. The lever 31, as well as the lever 27, is preferably duplicated on the two sides of the machine, the two levers 31 being connected at their outer ends by a shaft 36, which constitutes a handle for that part of the device. The perforations 34 are provided for the purpose of receiving cores 37, which are provided for the purpose of forming passages through the blocks when hollow blocks are to be molded. These cores are supported on the pallets by means of rods 38 passing through them and are provided with handles 39 for lifting them from the molded article. A projection 40 on each rod 38 extends through an opening 41 on the pallet and secures the core in position in a well-known manner.

Connected with the arms 29 is a transverse rod 42. Over this rod is mounted a hook 43, from which depends a link 44. This link supports a pair of outwardly-extending links 45, which are pivotally connected with a pair of levers 46 at a point below the point at which these levers are pivotally connected with the truck. Consequently the lowering of the arms 29 and rod 42 will cause the levers 46 to be forced outwardly, while raising of the same will cause them to be forced inwardly. These levers are each provided with a guide-pin or other form of projection 47, which engages in a socket 48, formed in the edge of the pallet either by means of a casting applied to the edge of the pallet or otherwise.

The operation of the device is very simple. The pallets are placed in convenient order between the tracks and centrally located upon their supports. The supports may be continuous throughout the length of the track, or there may be a single support for each pallet. The truck carrying the mold, with the parts in the position shown in Fig. 1, is moved along the track until it is immediately over a pallet. The levers 31 being raised, the guide-pins 47 enter the sockets 48 and not only guide the mold in the proper position with respect to the pallet, but hold it there during the subsequent operations. The cores are then inserted and the rod 38 turned so as to secure them in position by the turning of the projections 40 at right angles to the slots, through which they originally enter. The molding material, concrete, or the like is then introduced, and the levers 31 are brought over to the position shown in Fig. 3 and the tamping operation completed in a well-understood manner. When this is done, the levers are reversed to the position shown in Fig. 1 and are pressed down upon the arms 29. This causes the levers 27 to be raised, taking with them the frames 17, which releases the mold from the molded article in the manner above described. The cores may be removed either before or after this operation, preferably before. When the arms 29 are pressed down, the levers 46 are forced outwardly, as above described, and the pins 47 disengage from the pallet, so that the device can be moved around to the next pallet.

It will be noticed that the rear of the truck is left open, so that when the mold is lifted there will be no part which is in the path of the molded block, and the machine will be free to move along without damaging the latter.

It will of course be understood that while this invention has been described with special reference to molding hollow concrete-blocks it is well adapted for various other kinds of molding and is not limited to the production of any particular article.

Having thus described my invention, I claim as new and desire to secure by Letters Patent—

1. The combination with a mold having a core, of a truck adapted to support the mold, and means on the truck for tamping material in the mold, said tamping means having a passage through which a core projects when the tamping means is in operative position.

2. The combination with a mold, of a truck for supporting the mold, a frame pivotally mounted on the truck, a tamping device on the frame, and means on the truck for lifting the mold, said truck having an open rear end.

3. The combination with a mold, of a truck for supporting the mold, a frame pivotally mounted on the truck, a tamping device on the frame, and means on the truck for lifting the mold, said lifting means being operated by the movement of said frame.

4. The combination with a mold, of a truck having an open rear end, and means on the truck for lifting the mold.

5. The combination with a mold, of a truck for supporting the mold, said truck having an open rear end whereby the truck can be moved forwardly, leaving a molded article in stationary position, and means on the truck for lifting the mold.

6. The combination with a mold, of a truck, and means on the truck for lifting the mold and simultaneously spreading the mold-walls.

7. In a molding system, the combination of a track, a series of pallets located along the track, a truck adapted to move along the track over the pallets, a mold on the truck, and means on the truck for centering the mold over the pallets.

8. In a molding system, the combination of a track, a series of pallets located along the track, a truck adapted to move along the track over the pallets, a mold on the truck, means on the truck for centering the mold over the pallets, and means on the truck for tamping material in the mold.

9. In a molding system, the combination of a track, a series of pallets located along the track, a truck adapted to move along the track over the pallets, a mold on the truck, means on the truck for centering the mold over the pallets, and means on the truck for lifting the mold from the pallets.

10. In a molding system, the combination of a track, a series of pallets located along the track, a truck adapted to move along the track over the pallets, a mold on the truck, means on the truck for centering the mold over the pallets, said means comprising a centering-pin, a lever on which said centering-pin is mounted, and means on the truck for moving said lever and forcing the centering-pin into engagement with a pallet.

11. In a molding system, the combination of a track, a series of pallets located along the track, a truck adapted to move along the track over the pallets, a mold on the truck, means on the truck for centering the mold over the pallets, said means comprising a movably-mounted link, means for moving said link, a pair of links supported by the first-mentioned link and extending outwardly therefrom, and a pair of levers dependently mounted upon the truck and connected with said pair of links at a point below their point of suspension, said levers extending inwardly and being provided with centering-pins upon their inner ends, and the pallets being provided with sockets for receiving said pins.

12. In a molding system, the combination of a series of pallets, a truck adapted to move over them, means on the truck for centering a mold over the pallets, said means comprising a movably-mounted link, means for moving said link, a pair of links connected with the first-mentioned link, and a pair of levers dependently mounted upon the truck and connected with said pair of links at a point below their point of suspension; said levers extending inwardly, and being provided with centering-pins upon their inner ends for engaging the pallets.

13. In a molding system, the combination of a series of pallets, a truck adapted to move over them, and means on the truck for centering a mold over the pallets; said means comprising a centering-pin, a lever on which said centering-pin is mounted, and means on the truck for moving said lever and forcing the centering-pin into engagement with a pallet.

14. A molding system having a truck provided with a mold-centering device, comprising a centering-pin, a lever on which said pin is mounted, and means for moving the lever.

15. A molding system having a truck adapted to carry a mold, and provided with a mold-centering device.

16. In a molding device, the combination of a truck, a mold thereon, a frame connected with the mold, a lever for lifting said frame, said lever being pivoted upon the truck and having an arm extending beyond its pivotal point, and means for engaging said arm to lift the lever and mold.

17. In a molding device, the combination of a truck, a mold thereon, a frame connected with the mold, a lever for lifting said frame, said lever being pivoted upon the truck and having an arm extending beyond its pivotal point, a tamping device, and a frame pivotally mounted upon the truck for supporting said tamping device, said frame being adapted to engage said arm to operate said lever.

In testimony whereof I have signed my name to this specification in the presence of two subscribing witnesses.

WILLIAM SIEBER.

Witnesses:
 JOSEPH E. WUERSCH,
 SAMUEL DIXON HARRIS.